US008686992B1

(12) United States Patent
Makadia

(10) Patent No.: US 8,686,992 B1
(45) Date of Patent: Apr. 1, 2014

(54) METHODS AND SYSTEMS FOR 3D SHAPE MATCHING AND RETRIEVAL

(75) Inventor: Ameesh Makadia, New York, NY (US)

(73) Assignee: Google Inc., Mountain View, CA (US)

( * ) Notice: Subject to any disclaimer, the term of this patent is extended or adjusted under 35 U.S.C. 154(b) by 792 days.

(21) Appl. No.: 12/750,203

(22) Filed: Mar. 30, 2010

Related U.S. Application Data

(60) Provisional application No. 61/164,715, filed on Mar. 30, 2009.

(51) Int. Cl.
*G06T 15/00* (2011.01)
(52) U.S. Cl.
USPC ........... 345/419; 345/420; 345/421; 345/422; 345/423; 345/424; 345/425; 345/426; 345/427; 382/190
(58) Field of Classification Search
USPC .................................. 345/419–427; 382/190
See application file for complete search history.

(56) References Cited

U.S. PATENT DOCUMENTS

| | | | |
|---|---|---|---|
| 6,594,623 B1* | 7/2003 | Wang et al. ...................... 703/1 |
| 6,980,690 B1* | 12/2005 | Taylor et al. .................. 382/154 |
| 7,583,272 B2* | 9/2009 | Ramani et al. ................ 345/621 |
| 7,961,986 B1* | 6/2011 | Jing et al. ...................... 382/305 |
| 2004/0150640 A1* | 8/2004 | Park et al. ..................... 345/419 |
| 2009/0040225 A1* | 2/2009 | Wang et al. ................... 345/427 |
| 2009/0138468 A1* | 5/2009 | Kurihara .......................... 707/5 |
| 2009/0202155 A1* | 8/2009 | Hayashi et al. ............... 382/203 |
| 2010/0215271 A1* | 8/2010 | Dariush et al. ................ 382/180 |

OTHER PUBLICATIONS

Zhang; 2002, "An Integrated Approach to Shape Based Image Retrieval"; The 5th Asian Conference on Computer Vision, Jan. 23-25, 2002, Melbourne, Australia.*
Bartolini; 2005, "WARP: Accurate Retrieval of Shapes Using Phase of Fourier Descriptors and Time Warping Distance"; IEEE Transactions on Pattern Analysis and Machine Intelligence, vol. 27, No. 1, Jan. 2005.*

* cited by examiner

*Primary Examiner* — Xiao M. Wu
*Assistant Examiner* — Todd Buttram
(74) *Attorney, Agent, or Firm* — Dority & Manning, P.A.

(57) ABSTRACT

Methods and systems for 3D shape retrieval are described herein. An embodiment includes receiving a query 3D model, extracting a plurality of features of the query 3D model, comparing the features of the 3D query model against a plurality of features of one or more 3D models in a repository, calculating a similarity score based on the comparing step, ranking the 3D models based on the similarity score and returning one or more 3D models based on the ranking step. The embodiment further includes generating a representation of the query 3D model, calculating a correlation matching function between the representation of the query 3D model and representations of 3D models in the repository, determining a plurality of matching scores between the query 3D model and the 3D models in the repository for each rotational alignment of the 3D models and selecting the highest score from the plurality of matching scores based on the determining step.

21 Claims, 12 Drawing Sheets

METHODS AND SYSTEMS FOR 3D SHAPE MATCHING AND RETRIEVAL

CROSS-REFERENCE TO RELATED APPLICATION

This patent application claims the benefit of U.S. Provisional Patent Application No. 61/164,715, filed Mar. 30, 2009, entitled "Methods And Systems For 3D Shape Matching And Retrieval," which is incorporated herein by reference in its entirety.

BACKGROUND

1. Field

Embodiments of the present invention relate to computer graphics and particularly to three dimensional shape matching and retrieval.

2. Background Art

Laser-scanned objects, CAD models, and even image based reconstructions are a few of the sources contributing to the rapidly growing number of publicly available 3D model collections. Along with these 3D model collections, which are often vast, comes the need for fast, large-scale model matching and retrieval.

3D model retrieval continues to be an important practical as well as fundamental problem. At the core of any content-based model retrieval engine lies the challenge of computing 3D shape similarity. From the practical perspective, many large web repositories of 3D content fail to leverage shape content for model search, which often leads to search results of limited success and applicability.

One of the challenges for 3D shape matching is the wide variety of transformations that must be accounted for when comparing 3D models. For example, the most common transformations to which any 3D retrieval engine must be invariant are global changes in size, position, and orientation or 3D rotation.

In this regard, most of the approaches can be divided into two categories. The first category contains those approaches where invariance to possible transformations is built directly into extracted descriptors which are used to represent the 3D model. The second category contains those approaches that address the possible transformations of a model at the time when 3D model descriptors are being compared. However, there is a disadvantage when 3D model descriptors are compared because all possible transformations of the 3D model must be accounted for, leading to an increase in the cost of comparison.

BRIEF SUMMARY

Embodiments of the present invention relate to methods and systems for 3D shape matching and retrieval. An embodiment includes receiving a query 3D model on a processor, extracting a plurality of features of the query 3D model on a processor, comparing the features of the 3D query model against a plurality of features of one or more 3D models in a 3D model repository using a processor, calculating a similarity score based on the comparing step on a processor, ranking the 3D models based on the similarity score on a processor and returning one or more 3D models based on the ranking step. The embodiment further includes generating a representation of the query 3D model on a processor, calculating a correlation matching function between the representation of the query 3D model and representations of 3D models in the 3D model repository using a processor, determining a plurality of matching scores between the query 3D model and the 3D models in the 3D model repository for each rotational alignment of the query model on a processor and selecting the highest score from the plurality of matching scores based on the determining step on a processor. In another embodiment, a distance score is computed based on the comparing step on the processor and 3D models are ranked based on distance from the query 3D model.

A system embodiment includes a shape retrieval engine to receive a query 3D model and return one or more matching 3D models, wherein the shape retrieval engine further comprises a comparator, implemented in a computer-based system, to compare the features of the query 3D model against a plurality of features of one or more 3D models in a 3D model repository and to calculate a similarity score based on the comparing step. The embodiment further includes a ranking engine, implemented in a computer-based system, to rank one or more 3D models based on the similarity score.

In this way, embodiments of the invention allow a user to retrieve 3D models that match a query 3D model provided by the user. Furthermore, embodiments of the invention may use a rotational matching scheme which increases the efficiency of the 3D model comparison process.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the present invention relate to methods and systems for 3D shape matching and retrieval. An embodiment includes receiving a query 3D model on a processor, extracting a plurality of features of the query 3D model on a processor, comparing the features of the 3D query model against a plurality of features of one or more 3D models in a 3D model repository using a processor, calculating a similarity score based on the comparing step on a processor, ranking the 3D models based on the similarity score on a processor and returning one or more 3D models based on the ranking step. The embodiment further includes generating a representation of the query 3D model on a processor, calculating a correlation matching function between the representation of the query 3D model and representations of 3D models in the 3D model repository using a processor, determining a plurality of matching scores between the query 3D model and the 3D models in the 3D model repository for each rotational alignment of the 3D models on a processor and selecting the highest score from the plurality of matching scores based on the determining step on a processor.

A system embodiment includes a shape retrieval engine to receive a query 3D model and return one or more matching 3D models, wherein the shape retrieval engine further comprises a comparator, implemented in a computer-based system, to compare the features of the query 3D model against a plurality of features of one or more 3D models in a 3D model repository and to calculate a similarity score based on the comparing step. The embodiment further includes a ranking engine, implemented in a computer-based system, to rank one or more 3D models based on the similarity score.

In this way, embodiments of the invention allow a user to retrieve 3D models that match a query 3D model provided by the user. Furthermore, embodiments of the invention use a rotational matching scheme which increases the efficiency of the 3D model comparison process.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This detailed description of the embodiments of the present invention is divided into several sections as shown by the following table of contents.

TABLE OF CONTENTS

Figure 1A:
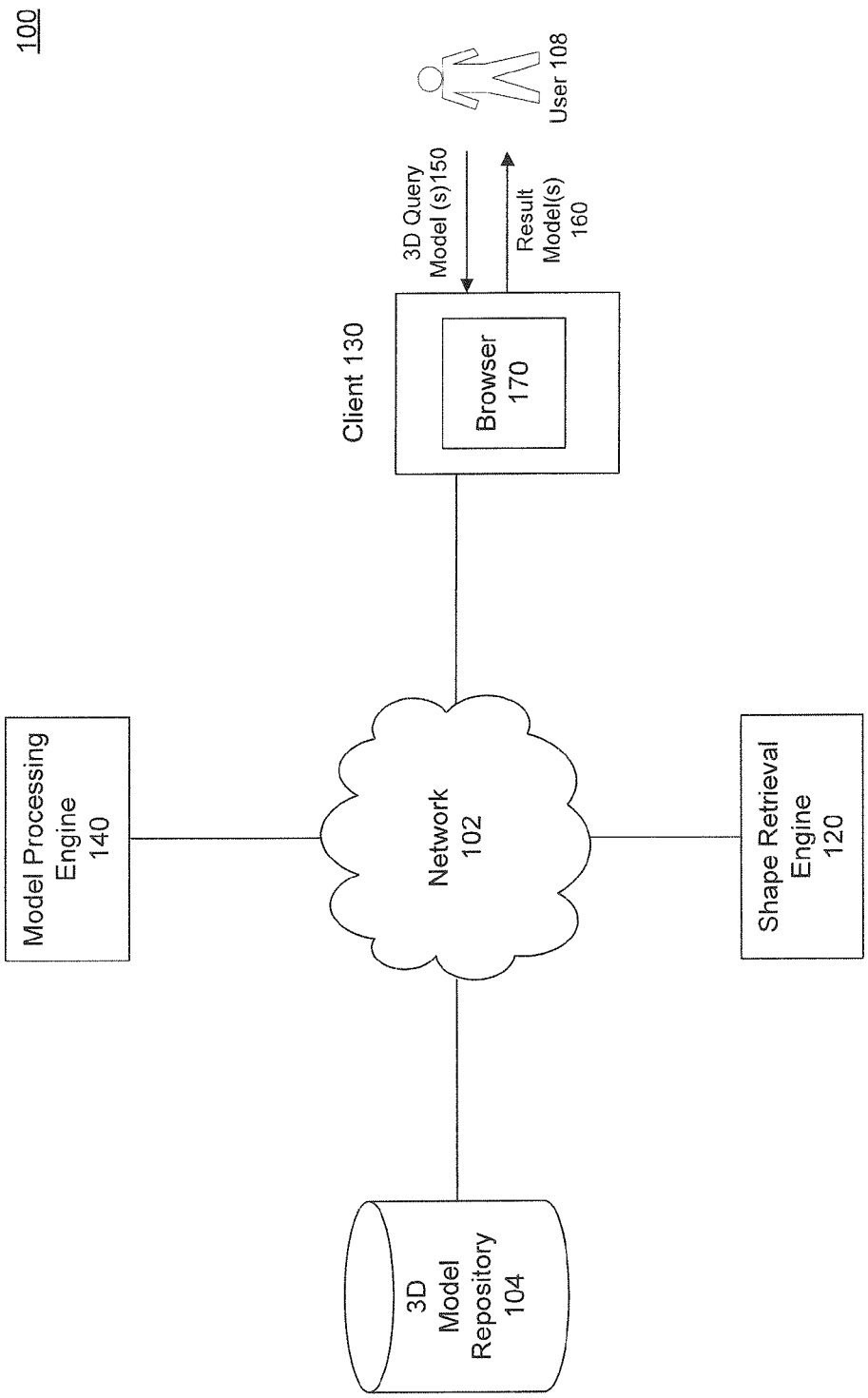
FIG. 1A is a diagram illustrating a system for 3D shape retrieval, according to an embodiment.

1. System
2. Silhouette Images and Viewpoints
3. Silhouette Descriptors
4. Fast Discrete Spherical and Rotational Fourier Transforms
5. Model Processing Engine
6. Shape Retrieval Engine and Query 3D Model
7. Coarse-to-Fine Estimation of Similarity
8. Example Computer Embodiment 1. System This section describes a system for 3D shape matching and retrieval according to an embodiment of the invention illustrated in FIG. 1A. FIG. 1A is a diagram of system 100 for 3D shape matching and retrieval. (While the following is described in terms of FIG. 1, the invention is not limited to this embodiment. For example, any system having generally the structure of FIG. 1A, or that would benefit from the operation, methods and functions as described herein may be used.)

System 100 includes 3D model repository 104, model processing engine 140, shape retrieval engine 120 and client 130. Client 130 further includes browser 170. User 108 may communicate with browser 170 through client 130.

Client 130 may be implemented on a computing device. Such a computing device can include, but is not limited to, a personal computer, mobile device such as a mobile phone, workstation, embedded system, game console, television, set-top box, or any other computing device that can support web browsing. Such a computing device may include, but is not limited to, a device having a processor and memory for executing and storing instructions. Such a computing device may include software, firmware, and hardware. Software may include one or more applications and an operating system. Hardware can include, but is not limited to, a processor, memory and graphical user interface display. An optional input device, such as a mouse or touch screen, may be used. Shape retrieval engine 120 may provide content that can be retrieved by client 130 over network 102. Content retrieved by client 130 can be displayed to user 108 by browser 170.

Network 102 may include one or more networks, including but not limited to, a local area network, medium-area network, and/or wide-area network, such as, the Internet. Network 102, for example, may be a wired or wireless network that allows client 130, model processing engine 140, 3D model repository 104 and shape retrieval engine 120 to communicate with each other. Network 102 can further support world-wide web protocols and services.

Client 130 may be implemented on any client device that can support web browsing. Such a client device can include, but is not limited to, a personal computer, mobile device such as a mobile phone, workstation, embedded system, game console, television, set-top box, or any other computing device that can support web browsing. Such a client device may include, but is not limited to, a device having a processor and memory for executing and storing instructions. Such a client device may include software, firmware, and hardware. The client device may also have multiple processors and multiple shared or separate memory components. Software may include one or more applications and an operating system. Hardware can include, but is not limited to, a processor, memory and graphical user interface display. An optional input device, such as a mouse, may be used. Client 130 may contact a shape retrieval engine 120 and download data to display though browser 170.

Browser 170 can communicate with shape retrieval engine 120 over network 102. Browser 170 can further communicate with an input (not shown) to allow a user to input data, to input commands, or to provide other control information to browser 170. User 108 may communicate with browser 170 using client 130. As an example, user 108 may provide an internet address to browser 170 to retrieve and display content corresponding to the internet address. Browser 170 may then provide a request for content to shape retrieval engine 120. Shape retrieval engine 120 may respond to the request by providing content back to browser 170 through client 130 over network 102. In an embodiment, browser 170 receives one or more 3D models as a query from user 108.

3D model repository 104 may include a plurality of 3D models. As an example, not intended to limit the invention, each 3D model may be stored in an Object File Format (e.g. ".off" format) with polygonal geometry associated with the 3D model. Additionally, for example, 3D model repository 104 may also include a model information file and a thumbnail image of each 3D model.

3D model repository 104 may include models in the open COLLADA file format. COLLADA defines an open standard XML schema for exchanging digital assets among various graphics software applications that might otherwise store their assets in incompatible file formats. COLLADA documents that describe digital assets are XML files, usually identified with a .dae (digital asset exchange) filename extension.

In another example, 3D model repository 104 may store a plurality of user generated 3D models. Such user generated 3D models may be provided by user 108 to 3D model repository 104 through client 130 via network 102. 3D model repository 104 may be a web-based repository that communicates over network 102 using web-based protocols. As an example, 3D model repository 104 may be implemented on a computing device that includes a database or any another data repository.

Figure 1B:
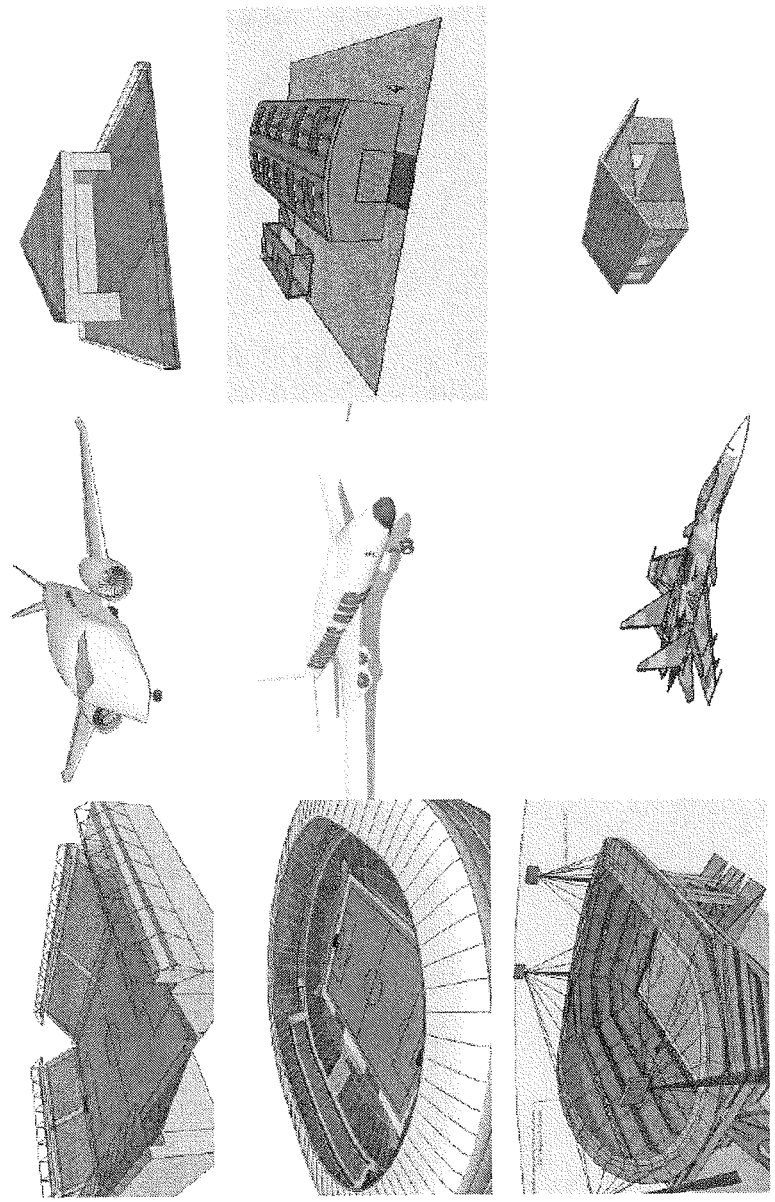
FIG. 1B is a diagram illustrating exemplary 3D models in a 3D model repository, according to an embodiment.

FIG. 1B illustrates images of exemplary models that may be included in 3D model repository 104. As illustrated in FIG. 1B, 3D model repository can each model can be associated with a different degree of complexity. Furthermore, each individual model files or COLLADA document can consist of multiple objects.

Model processing engine 140 processes 3D models in 3D model repository 104 and also query 3D model(s) 150 provided by user 108, according to embodiments of the invention. Model processing engine 140 may process 3D models in 3D model repository 104 either prior to receiving a query 3D model 150 (i.e. 'offline') or after receiving query 3D model 150 (i.e. in 'real-time'). In an embodiment, model processing engine 140 generates a plurality of images, such as silhouette images, using a 3D model, from a plurality of viewpoints surrounding the 3D model and generates a representation of the 3D model. Silhouette images and the operation of model processing engine 140 are described further below. As an example, model processing engine 140 may be implemented on a computing device. Such a computing device may include, but is not limited to, a device having a processor and memory for executing and storing instructions. Such a computing device may include software, firmware, and hardware. Software may include one or more applications and an operating system. Hardware can include, but is not limited to, a processor, memory and graphical user interface display. An optional input device, such as a mouse or touch screen, may be used.

Shape retrieval engine 120 may receive one or more query 3D model(s) 150 from client 130 though network 102. Upon receiving a query 3D model 150, shape retrieval engine may return one or more matching 3D model(s) 160 to client 130 for display to user 108 using browser 170. In an embodiment, shape retrieval engine 120 uses input from model processing engine 140 to identify and retrieve matching 3D models from 3D model repository 104. As an example, shape retrieval engine 120 may be implemented on a computing device. Such a computing device may include, but is not limited to, a device having a processor and memory for executing and storing instructions. Such a computing device may include software, firmware, and hardware. Software may include one or more applications and an operating system. Hardware can include, but is not limited to, a processor, memory and graphical user interface display. An optional input device, such as a mouse or touch screen, may be used. The operation of shape retrieval engine 120 is described in detail further below.

The following sections provide an overview of silhouette images, view points and descriptors that may be used in embodiments of the invention.

2. Silhouette Images and Viewpoints

In an embodiment, model processing engine 140 extracts a plurality of silhouette images from each 3D model. Silhouette images are well known to those skilled in the art and may be digital images that are extracted from a plurality of viewpoints surrounding the 3D model. As an example, not intended to limit the invention, these viewpoints may be located on a spherical region surrounding the 3D model. Furthermore, for example, in one feature model processing engine 140 may select viewpoints in a manner that captures a maximum amount of non-overlapping visual information using a minimum number of silhouette images to reduce redundancy. In an embodiment this can be achieved by model processing engine 140 by distributing the view points over a spherical region that surrounds the 3D model. The silhouettes from two different models may be compared pair wise for a finite set of 3D rotations.

It is to be appreciated that although the following is described in terms of silhouette images, the invention is not limited to this embodiment and any colored, grayscale or digital image in any form may be used. For example, a colored image may be rendered if a 3D model is associated with textures. The number of images rendered, and their specific locations, can be modified by model processing engine 140.

Silhouette images used in embodiments of the invention are described further below.

3. Silhouette Descriptors

In an embodiment, a plurality of descriptors, such as silhouette descriptors, may be generated by model processing engine 140 using features extracted from the silhouette images.

Silhouette descriptors are well known to persons skilled in the art and can be viewed as a mapping from the space of silhouette images (or any other two dimensional binary images). Examples of silhouette descriptors that may be used include, but are not limited to, Zernike descriptors and contour distance descriptors. Silhouette descriptors may be used to maximize shape discrimination ability associated with 3D models with a low-dimensional and sparse feature set. Thus, while silhouette descriptors enable effective retrieval, they also can satisfy practical requirements of computation and storage efficiency.

As an example, not intended to limit the invention, when silhouette descriptors of two 3D models are compared, it is effectively the individual silhouette images which are being compared. Furthermore, for example, when comparing two silhouette images, a Zernike descriptor (or similarly just the contour-distance descriptor) could be used. Generally, a Zernike descriptor is a vector of Zernike moment coefficients obtained by projecting a 2D silhouette image onto a set of circular, complex Zernike polynomials of increasing degree.

Another example of a descriptor is the contour distance descriptor which is obtained from a first few Fourier coefficients of a periodic function. The periodic function is obtained by computing the distance at each point along a shape contour of a 3D model. Also, only a subset of the Zernike descriptor coefficients (or similarly a subset of the contour distance coefficients) could be used for comparison.

Both the Zernike descriptor and the contour distance descriptor are described in detail in "Zhang, D. S., Lu, G.: An Integrated Approach to Shape Based Image Retrieval. In: Proc. of 5th Asian Conference on Computer Vision (ACCV), pp. 652-657, Melbourne (2002)" which is incorporated by reference herein in its entirety.

4. Fast Discrete Spherical and Rotational Fourier Transforms

In an embodiment, spherical and rotational Fourier transforms are used with silhouette images to generate representations of 3D models and to obtain correlation functions between the 3D models.

In general, the practical utility of Fourier transforms can be enhanced with the use of fast algorithms to perform the transforms. As known to a person skilled in the art, a spherical Fourier Transform is a fast discrete algorithm based on a separation of variables technique. Separation of variables is any of several methods for solving ordinary and partial differential equations, in which algebra allows one to rewrite an equation so that each of two variables occurs on a different side of the equation. Furthermore it is known that the complexity of the Spherical Fourier transform is $O(L^2 \log^2 L)$, where L is the "bandwidth" of the spherical function. In practice, for example, the selection of L specifies that only those coefficients of degree less than L will be retained from the Fourier transform. The sampling requirement for the fast transform is that 2L samples must be placed uniformly in each spherical coordinate (i.e. 2L samples in longitude, and 2L samples in azimuth). In embodiments of the invention, bandwidth L is associated with the number of silhouette images that are to be extracted by model processing engine 140 from a 3D model.

Figure 2A:
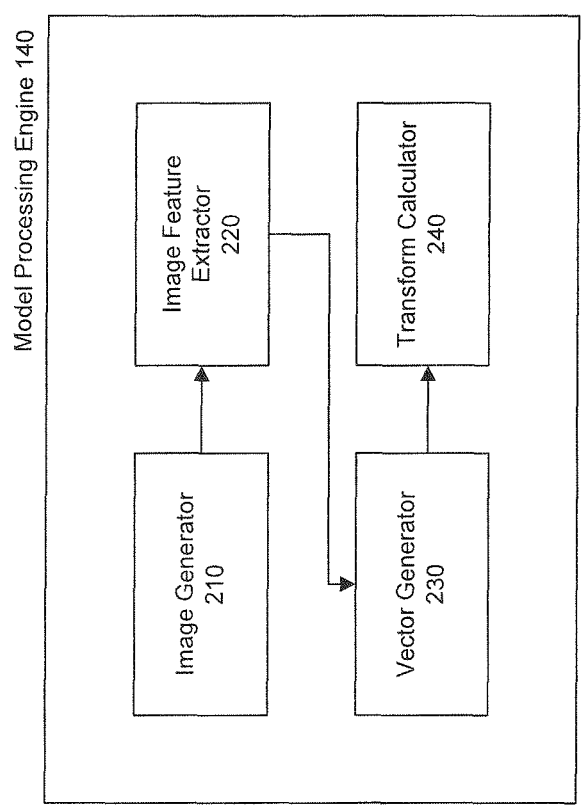
FIG. 2A is a diagram of a model processing engine, according to an embodiment.
Figure 2B:
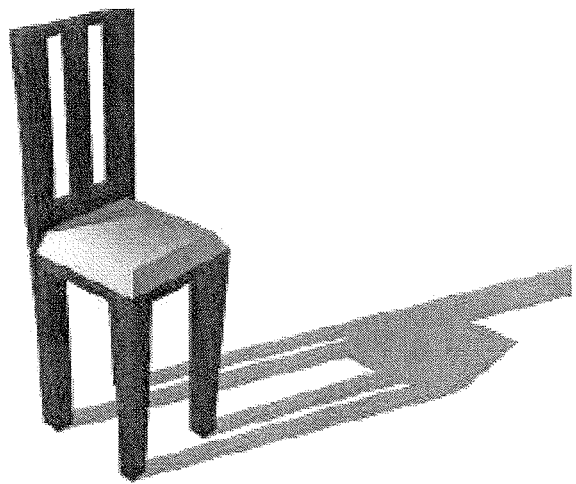
FIG. 2B illustrates an exemplary 3D model and a plurality of silhouette images extracted from the 3D model, according to an embodiment.
Figure 2B:
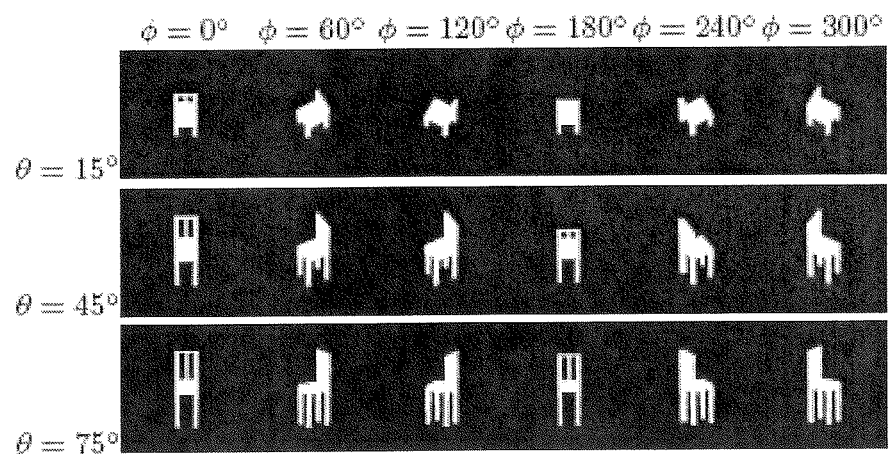
Figure 2C:
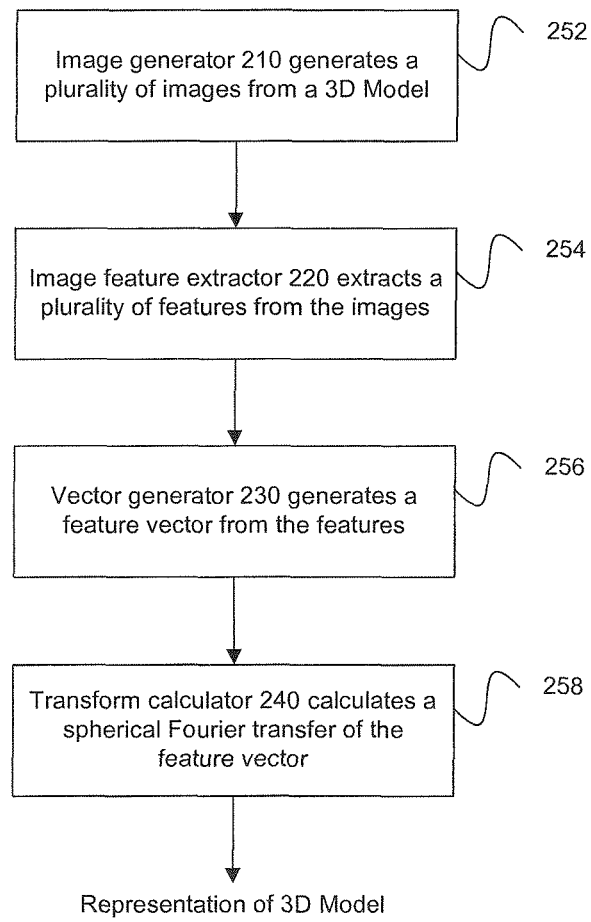
FIG. 2C is a flowchart illustrating an exemplary operation of a model processing engine, according to an embodiment.
Figure 2D:
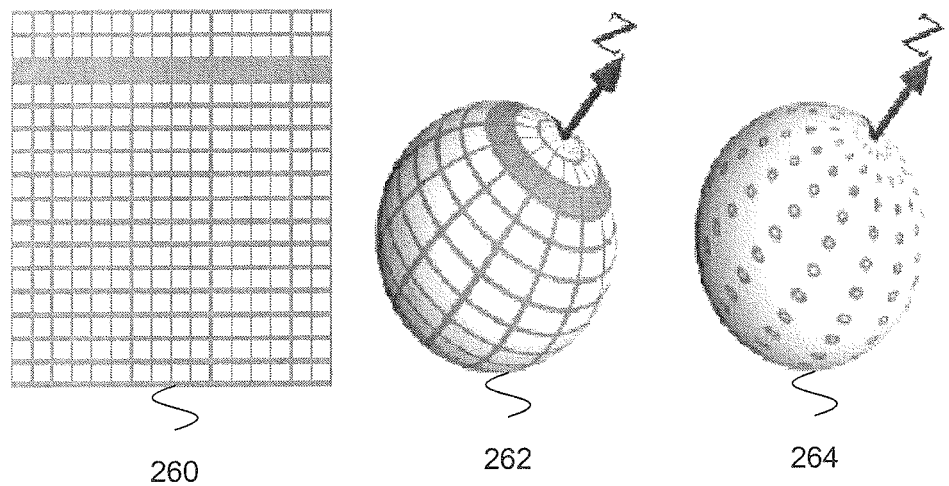
FIG. 2D illustrates an exemplary effect of the sampling requirement for fast Fourier transforms on the distribution of spherical silhouette viewpoints.

FIG. 2D illustrates an exemplary effect of a sampling requirement for a fast transform on the distribution of spherical silhouette viewpoints in one example.

In FIG. 2D, diagram 260 is a representation of a uniformly sampled spherical grid, with 16 samples spaced uniformly in each dimension. As an example, this is the sampling requirement for a fast Spherical Fourier transform at bandwidth L=8. Diagram 262 depicts the corresponding sample support regions as they appear on a sphere. The highlighted bins correspond to the highlighted row in diagram 260. The circles in diagram 264 specify actual sample locations on the sphere.

Similar to the fast discrete spherical Fourier transform, there exists a separation of variables technique for a fast discrete SO(3) Fourier transform. As is known in the art, the rotation group, SO(3), is the group of all rotations about the origin of three-dimensional Euclidean space R3. The complexity for such a technique is $O(L^3 \log^2 L)$, where once again L is the bandwidth parameter which specifies the largest degree of coefficient kept from the transform. In general terms, any 3D rotation can be decomposed into a rotation about the Z axis, followed by a rotation about the Y axis, followed by a third and final rotation about the Z axis.

Embodiments of the invention described below, as first recognized by the inventor, may use the inverse SO(3) Fourier transform to obtain at least a correlation function between two 3D models. Correlation functions are described further below.

5. Model Processing Engine

FIG. 2A is a diagram of model processing engine 140, according to an embodiment of the invention. As shown in FIG. 2A, model processing engine 140 may further include image generator 210, image feature extractor 220, vector generator 230 and transform calculator 240. The operation of model processing engine 140 and its components 210-240, in one embodiment, will be described further below with respect to an exemplary 3D model and silhouette images (FIG. 2B) and a flowchart (FIG. 2C).

In an embodiment, model processing engine 140 processes the 3D models in 3D model repository 104 to generate representations of each 3D model. These representations can then be used for 3D shape matching by shape retrieval engine 120. Model processing engine 140 may process 3D models in 3D model repository 104 either prior to receiving a query 3D model 150 (i.e. 'offline') or after receiving query 3D model 150 (i.e. in 'real-time').

In an embodiment, image generator 210 renders silhouette images of each 3D model from a plurality of viewpoints surrounding each 3D model. These viewpoints which surround each 3D model may be pre-specified also in part by user 104. Image generator 210 may also select viewpoints that capture the most amount of non-overlapping visual information using a minimum number of images (such as the smallest number) to reduce redundancy.

FIG. 2B illustrates an exemplary 3D model and a plurality of silhouette images that are extracted from the 3D model.

As illustrated in FIG. 2B, for an exemplary bandwidth L=3, (2L×2L)=36 silhouette images will be rendered by model processing engine 140. Model processing engine 140 can place viewpoint samples spaced uniformly in each of the two spherical coordinates. Since silhouette images from antipodal points are redundant, only one hemisphere of silhouettes (e.g. 18 images) needs to be generated. An antipodal point of a given point on the surface of a sphere, for example, is the point which is diametrically opposite the given point. The antipodal point is so situated that a line drawn from the one to the other passes through the centre of the sphere and forms a true diameter.

FIG. 2B thus illustrates 18 silhouette images and the corresponding viewpoint angles at which they were generated by image generator 210. For example, the top row corresponds to silhouettes from viewpoints with fixed longitude (θ) of 15° but varying azimuth (Ø) from 0° to 300°.

As shown in FIG. 2B, each rendered image may be a black and white image. It is to be appreciated that although the following is described in terms of silhouette images, the invention is not limited to this embodiment and any colored, grayscale or digital image in any form may be used. For example, a colored image may be rendered if a 3D model is associated with textures. The number of images rendered, and their specific locations, can be modified.

In another embodiment image generator 210 may capture a depth map, where each pixel marks the distance from the model to the silhouette plane, to help disambiguate between very different objects which generate similar silhouettes. This can allow image generator 210 to retain more information beyond a binary silhouette image.

In an embodiment, image generator 210 takes advantage of having structural information of a 3D model to reduce the computational and storage burden of features. For example, for silhouette images, knowing that the silhouette generated at any point 'p' on a sphere is just a projection of the model onto the silhouette plane, it is clear that the silhouette generated from the antipodal point '−p' will contain no extra information. The first advantage is that image generator 210 generates silhouettes from one hemisphere, reducing the total number of images rendered per model. This is greatly reduces computation effort.

Furthermore, because a silhouette generated at any point 'p' on a sphere is just a projection of the model onto the silhouette plane, the underlying spherical function M (p,v) has the even property that M(p, v)=M(−p, v). For such functions, all spherical Fourier coefficients of an odd degree are zero. Also, since the spherical function itself is real-valued (since the silhouette descriptors are real-valued), the coefficient vectors exhibit the property that opposite orders are related by conjugation. In an embodiment, these facts allow image generator 210 to compute spherical Fourier coefficients for only even degrees of the Fourier coefficients. This greatly reduces storage space of descriptors.

In this way, embodiments of the invention may allow for reduced computation effort coupled with efficient use of storage space.

Image feature extractor 220 extracts features which characterize a shape of the silhouette from each silhouette image generated by image generator 210. These features may be scale and translation invariant features or any other form of features that can be extracted from digital images. These features can be used for pair wise comparison of any two silhouette images.

Vector generator 230 then uses features extracted by image feature extractor 220 to form a vector valued function on a sphere of viewpoints surrounding the 3D model from where the images have been extracted. Thus, at each point on the sphere, there exists a feature vector corresponding to the silhouette extracted from that viewpoint by image feature extractor 220.

Transform calculator 240 then calculates a spherical Fourier transform of the vector valued function to obtain a representation of the 3D model. The number of coefficients generated from the Spherical Fourier transforms can be varied by transform calculator 240. By varying this number, one can control the resolution and speed of the process. For instance, by using a greater number of coefficients resolution could be increased but speed may be reduced. Also, by using a smaller number of coefficients resolution could be decreased but speed may be increased.

FIG. 2C is flowchart 250 illustrating an exemplary operation of model processing engine 140, according to an embodiment of the invention.

Image generator 210 in model processing engine 140 generates a plurality of silhouette images from a 3D model received by model processing engine 140 (step 252). Image feature extractor 220 extracts a plurality of features from the silhouette images extracted in step 252 (step 254). Vector generator 230 uses the features extracted in step 254 to generate a feature vector (step 256). Transform calculator 240 then calculates a spherical Fourier transform of the feature vector generated in step 256 to output a representation of the 3D model (step 258).

In this way embodiments of the invention allow for feature generation through generation of 3D model silhouette images, extracting global features from the silhouette images and then performing a spherical Fourier transform given the collection of silhouette features.

6. Shape Retrieval Engine and Query 3D Model

In an embodiment, shape retrieval engine 120 receives a representation of a query 3D model 150 from model processing engine 140. As an example, such query 3D model 150 may be received by model processing engine 140 through network 102 from user 108. Furthermore, query 3D model 150 can be a unique model that is not in 3D model repository 104, or can be one of the models in 3D model repository 104.

As described earlier, when model processing engine 140 receives a 3D model such as query 3D model 150, image generator 210 renders silhouette images of query 3D model 150 from a plurality of viewpoints surrounding the model. These viewpoints which surround query 3D model 150 may be pre-specified by user 104. Image generator 210 may also select viewpoints that capture a maximum amount of non-overlapping visual information using a minimum number of images to reduce redundancy.

Image feature extractor 220 then extracts features which characterize a shape of the silhouette from each silhouette image. These features may be scale and translation invariant features. These features can be used for pair wise comparison of any two rendered images.

Vector generator 230 then uses features extracted by image feature extractor 220 to form a vector valued function on a sphere of viewpoints. Thus, at each point on the sphere, there exists a feature vector corresponding to the silhouette extracted from that viewpoint by image feature extractor 220.

Transform calculator 240 then calculates a spherical Fourier transform of the vector valued function to obtain a representation of query 3D model 150.

In this way, model processing engine 140 extracts features of query 3D model 150 and obtains a representation of query 3D model 150. In an embodiment, shape retrieval engine 120 may also be used to extract feature and generate a representation of the query 3D model 150. For example, query 3D model 150 may be provided to shape retrieval engine 120 instead of model processing engine 140. This allows for generation of 3D model representation within shape retrieval engine 120.

In an embodiment, shape retrieval engine 120 then uses a representation of query 3D model 150 to retrieve a plurality of similar or matching models from 3D model repository 104. In order to accomplish this, in an embodiment, shape retrieval engine 120 compares features of 3D query model 150 against the features of every 3D model in the 3D model repository 104.

Figure 3:
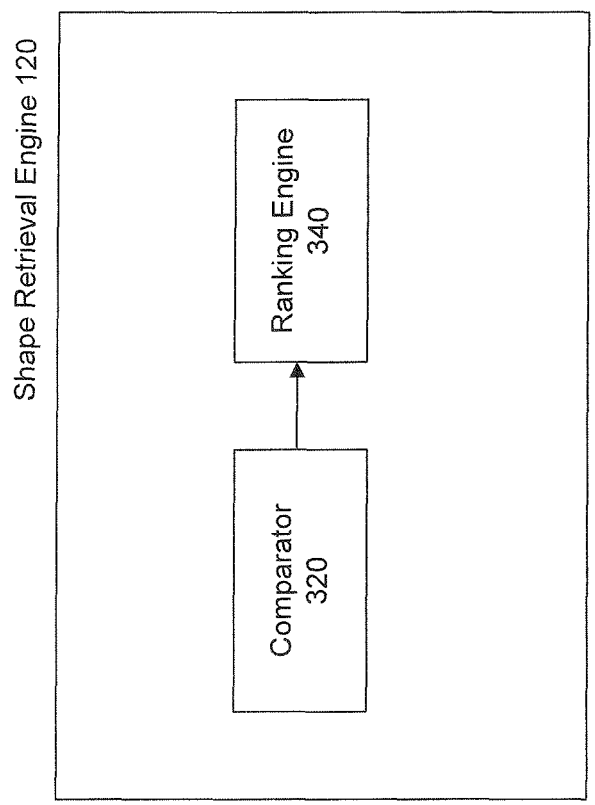
FIG. 3 is a diagram illustrating a shape retrieval engine, according to an embodiment.

FIG. 3 is a diagram of shape retrieval engine 120, according to an embodiment of the invention. As shown in FIG. 3, shape retrieval engine 120 may further include comparator 320 and ranking engine 340.

In an embodiment, comparator 320 in shape retrieval engine 120 uses the representations of query 3D model 150 and one of the plurality of 3D models in 3D model repository 104 to generate a correlation matching function between the two 3D models.

This process of generating a correlation matching function by comparator 320 may include combining the coefficients of two 3D models by multiplication, and then calculating an inverse rotational Fourier transform. This effectively computes a matching score between models for every possible rotational alignment.

In this way, a rotational matching scheme that uses a faster algorithm such as a rotational Fourier transform, increases the efficiency of the 3D model comparison process.

In an embodiment, not intended to limit the invention, an inverse SO(3) Fourier transform can be used by comparator 320 to obtain the correlation matching function. The sampling properties of the fast discrete SO(3) Fourier transform are such that if only those coefficients with degree less than bandwidth 'L' are used in the inverse transform, 2L samples can be uniformly spaced in each of the three Euler angles $\alpha$, $\beta$, and $\gamma$. As with the spherical transform, this uniform sampling in Euler angles leads to a non-uniform sampling in rotation space.

The number of coefficients generated from the Spherical Fourier transforms, or the number of coefficients used in the final inverse Rotational transform, can be varied. By varying this number, comparator 320 and shape retrieval engine 120 can control the resolution and speed of the algorithm. By evaluating these correlations using techniques from signal processing on the sphere, shape retrieval engine 120 can control all aspects of the algorithm with a single bandwidth parameter L.

In an embodiment, model comparisons using comparator 320 can be performed faster by performing the correlations between two 3D models at smaller resolutions. This can be obtained by varying the number of Fourier coefficients used in the correlation. By reducing the number of coefficients, a faster correlation estimate may be obtained for a sparser sampling of the rotation space. This property allows for a hierarchical model recovery approach, where in each successive pass 3D model repository 104 can be pruned with correlation comparisons by comparator 320 in shape retrieval engine 120 using increasing numbers of Fourier coefficients.

Returning to the operation of comparator 320, given the model matching score for every possible rotational alignment, comparator 320 picks the highest score overall as the similarity score between the two 3D models.

Ranking engine 340 then uses the similarity score between the 3D query model 150 and every model in 3D model repository 104, and sorts the 3D models from the most similar to least similar to query 3D model 150. Shape retrieval engine 120 then uses the output of ranking engine 340 to return a fixed number of 3D models from the sorted list generated by ranking engine 340 and returns result 3D model(s) 160 to user 108 through browser 170.

In an embodiment, if 3D query model is expected to be in the 3D model repository 104, all the nearest similar neighbors can be computed offline by model processing engine 140.

Figure 4A:
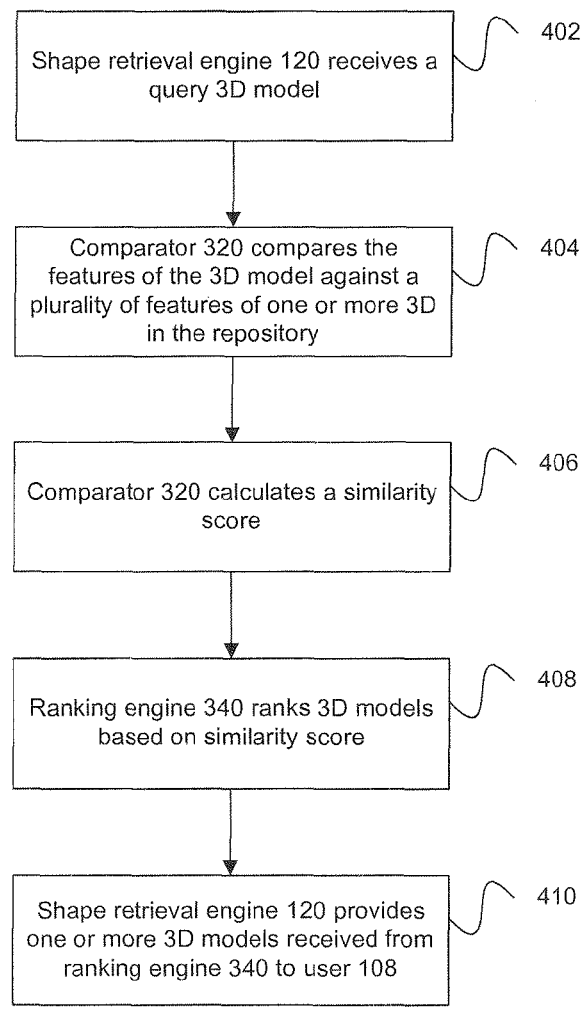
FIG. 4A is flowchart illustrating an exemplary operation of a shape retrieval engine, according to an embodiment.

FIG. 4A is flowchart 400 illustrating an exemplary operation of shape retrieval engine 120 (steps 402-410), according to an embodiment of the invention.

Shape retrieval engine 120 receives a representation of query 3D model 150 from model processing engine 140 (step 402). Comparator 320 in shape retrieval engine 120 compares features of 3D query model 150 against the features of every 3D model in the 3D model repository 104 (step 404). Comparator 320 then calculates a similarity score between query 3D model 150 and a plurality of 3D models in 3D model repository 104 (step 406). Ranking engine 340 uses the similarity score between the query model and every model in the database, and sorts the 3D models from most similar to least similar to query 3D model 150 (step 408). Shape retrieval engine 120 then uses the output of ranking engine 340 to return a fixed number of 3D models from the sorted list generated by ranking engine 340 and returns the 3D models to user 108 through browser 170 (step 410).

Figure 4B:
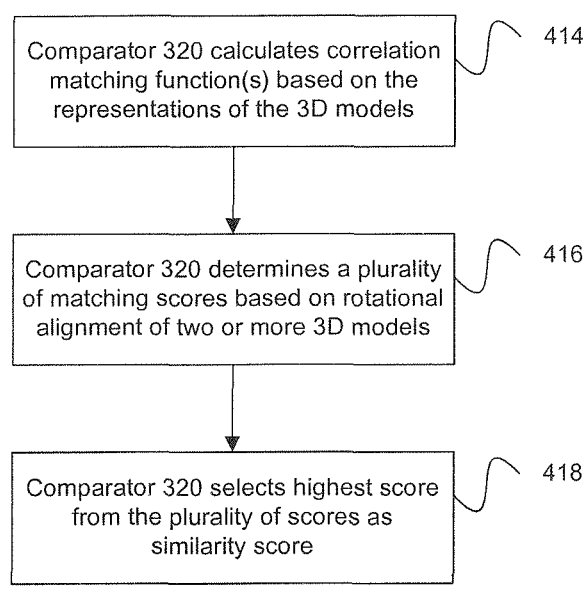
FIG. 4B is flowchart illustrating step 406 of FIG. 4A in detail, according to an embodiment.

FIG. 4B is flowchart illustrating step 406 of flowchart 400 in greater detail, according to an embodiment of the invention.

Comparator 320 in shape retrieval engine 120 uses the representations of query 3D model 150 and one of the plurality of 3D models in 3D model repository 104 to generate a correlation matching function between two 3D models (step 414). Comparator 320 uses the correlation matching function to determine a plurality of matching scores based on at least a rotational alignment of two or more 3D models (step 416). Given the model matching score for every possible rotational alignment, comparator 320 selects the highest score overall as the similarity score between the two 3D models (step 418).

Figure 4C:
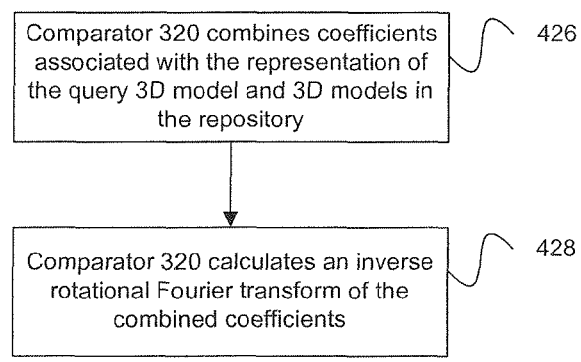
FIG. 4C is flowchart illustrating step 414 of FIG. 4B in detail, according to an embodiment.

FIG. 4C is flowchart illustrating step 414 of FIG. 4B in greater detail, according to an embodiment of the invention.

Comparator 320 combines coefficients associated with the representation of query 3D model 150 and a one or more 3D models in 3D model repository 104 (step 426). Comparator 320 then calculates an inverse rotational Fourier transform of the combined coefficients (step 428).

Embodiments of the invention may also overcome any dependence between the number of silhouette viewpoints distributed over the sphere and the number of rotations that can be evaluated at the time of retrieval. This is because embodiments of the invention allow for an arbitrarily dense sampling of the viewing sphere. The discrete spherical Fourier transform sampling theorem only requires 2L silhouette viewpoint samples uniformly spaced in the each of the two spherical coordinates. By increasing the bandwidth L, embodiments of the invention can achieve a sampling where the maximum distance between any sample and its nearest neighbor is arbitrarily small.

Furthermore, increasing the bandwidth 'L' (i.e. generating more silhouettes) may have two effects. Firstly, the number of spherical Fourier coefficients generated will increase. As an example, not intended to limit the invention, going from bandwidth L to L+1 will increase the number of spherical coefficients from $L^2$ to $(L+1)^2$. Secondly, the accuracy of the first $L^2$ coefficients will increase. Essentially, even if shape retrieval engine 120 uses only a few coefficients (i.e. small number of L) during model comparison, the accuracy of these coefficients will only increase when using more silhouettes at the time of feature generation. Thus, for applications where feature generation is done offline (e.g. when building a 3D model repository for search and retrieval), it can be beneficial to use as many silhouettes as desired.

Additionally, during model comparison stage by comparator 320, comparator 320 can vary the number of coefficients used when performing the inverse Rotational Fourier transform to obtain the correlation functions.

For example, let L be the bandwidth used by image generator 210 when generating the model silhouettes. If the bandwidth used by comparator 320 when performing the inverse rotational Fourier transform (i.e. L') is equal to L, shape retrieval engine 120 would be considering all model alignments that can be evaluated.

In an embodiment, shape retrieval engine 120 can choose to evaluate fewer rotations simply by setting L'<L. Similarly, in another embodiment, shape retrieval engine 120 can evaluate more rotations by setting L'>L. As an example, this can be achieved by assuming that all spherical Fourier coefficients of the descriptor are zero for L≤l<L'. This allows shape retrieval engine 120 to evaluate an arbitrarily dense sampling of rotations while keeping the number of silhouettes fixed. Effectively, all these extra rotations are being evaluated by interpolating the correlation function. This allows for a more natural method for descriptor interpolation.

7. Coarse-to-Fine Estimation of Similarity

As described earlier, by varying the bandwidth used during the inverse SO(3) transform, comparator 320 in shape retrieval engine 120 can obtain correlation functions with different resolutions. This allows for a natural and intuitive way to perform an iterative, coarse-to-fine evaluation of the similarity between two functions. By simply varying the bandwidth used during the inverse Rotational Fourier transform, comparator 320 can obtain correlation functions with different resolutions.

Further to the preceding description, consider the following example. For a given bandwidth L there can be 2L samples spaced uniformly in each of the three Euler angles. (Euler angles are well known in the art and are a means of representing the spatial orientation of any frame of the space as a composition of rotations from a reference frame. As an example, not intended to limit the invention, in order to give a 3D object a specific orientation, it may be subjected to a sequence of three rotations described by the Euler angles.) Hence, increasing the bandwidth from L to L+1 will introduce 3(L2+L)+1 more samples into the space of 3D rotations. Thus using this principle, shape retrieval engine 120 can implement a staggered, incremental search when dealing with large repositories of 3D models. At each iteration, those 3D models most dissimilar from a query at a given bandwidth can be discarded by shape retrieval engine 120. The remaining models in 3D model repository 104 can be re-ranked in a subsequent iteration by evaluating the correlation function at a higher resolution (increased bandwidth). As an example such an approach is possible because by increasing the bandwidth during comparison implies that comparator 320 can incorporate higher-frequency information when estimating a correlation function.

In another example, not intended to limit the invention, first, the similarity scores are computed for all model pairs at the lowest bandwidth (e.g. L=3). In the second pass, shape retrieval engine 120 identifies, for example, 20% of the models which have the highest similarity, and re-ranks these queries by computing similarity using bandwidth L=5. In the third and final pass, shape retrieval engine 120 re-ranks, for example, the 1% most similar models using bandwidth L=17. This example is illustrative and is not intended to limit the invention.

In this way, shape retrieval engine 120 may use a coarse-to-fine estimation of similarity to accomplish a staggered, incremental search when dealing with large repositories of 3D models.

Figure 4D:
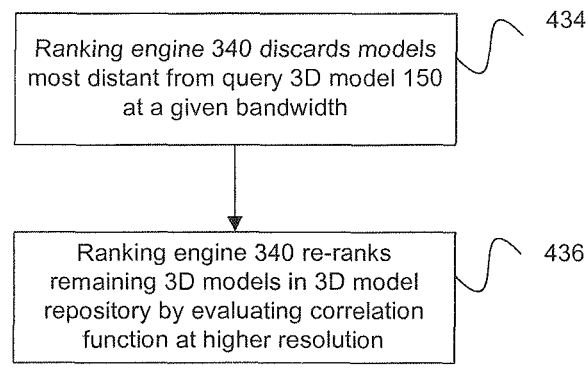
FIG. 4D is flowchart illustrating step 410 of FIG. 4A in detail, according to an embodiment.

FIG. 4D is flowchart illustrating step 410 of FIG. 4A in greater detail, according to an embodiment of the invention.

Ranking engine 340 discards models most dissimilar from query 3D model 150 at a given bandwidth (step 434). Ranking engine 340 then re-ranks remaining 3D models in 3D model repository 104 by evaluating the correlation matching function at a higher resolution (step 436).

In this way, for a given 3D query model, finding the closest models in the database can be performed in a coarse-to-fine approach. For example, each model can be ranked from most similar to least similar using an approximate or rough similarity measure. In a subsequent pass, a more precise or accurate similarity computation can be used by shape retrieval engine 120 to re-rank the most similar models in 3D model repository 120. In an embodiment, not intended to limit the invention, steps 434 and 436 of FIG. 4D may be optionally performed.

Although in the preceding embodiments, shape retrieval engine 120 computes model alignment at the time of model comparison, in an alternative embodiment model processing engine 140 can build rotational invariance directly into the model descriptors. As an example, feature descriptors which are invariant to model transformations may lead to faster comparison (since no search over a transformation space needs to be done online), and are also suitable for use with standard off-the-shelf classification techniques (e.g. SVM classifiers). This may be done by computing the rotation-invariant coefficient vector magnitudes allowing for much faster comparison.

8. Example Computer Embodiment

Figure 5:
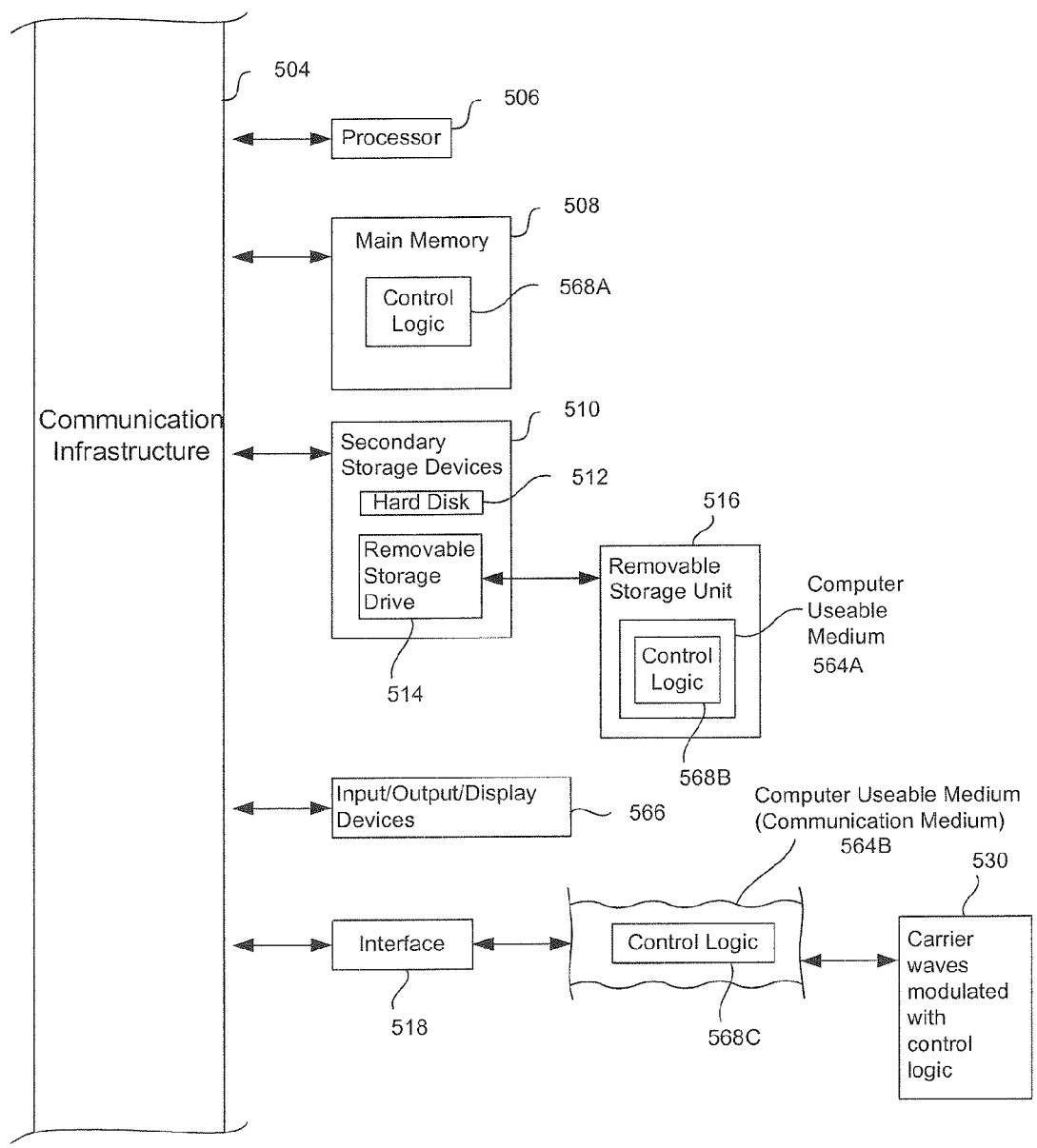
FIG. 5 illustrates an example computer useful for implementing components of embodiments.

In an embodiment of the present invention, the system and components of embodiments described herein are implemented using well known computers, such as example computer 502 shown in FIG. 5. For example, model processing engine 140, shape retrieval engine 120 or client 130 can be implemented using computer(s) 502.

The computer 502 can be any commercially available and well known computer capable of performing the functions described herein, such as computers available from International Business Machines, Apple, Sun, HP, Dell, Compaq, Digital, Cray, etc.

The computer 502 includes one or more processors (also called central processing units, or CPUs), such as a processor 506. The processor 506 is connected to a communication infrastructure 504.

The computer 502 also includes a main or primary memory 508, such as random access memory (RAM). The primary memory 508 has stored therein control logic 525A (computer software), and data.

The computer 502 also includes one or more secondary storage devices 510. The secondary storage devices 510 include, for example, a hard disk drive 512 and/or a removable storage device or drive 514, as well as other types of storage devices, such as memory cards and memory sticks. The removable storage drive 514 represents a floppy disk drive, a magnetic tape drive, a compact disk drive, an optical storage device, tape backup, etc.

The removable storage drive 514 interacts with a removable storage unit 516. The removable storage unit 516 includes a computer useable or readable storage medium 524 having stored therein computer software 528B (control logic) and/or data. Removable storage unit 516 represents a floppy disk, magnetic tape, compact disk, DVD, optical storage disk, or any other computer data storage device. The removable storage drive 514 reads from and/or writes to the removable storage unit 516 in a well known manner.

The computer 502 also includes input/output/display devices 522, such as monitors, keyboards, pointing devices, etc.

The computer 502 further includes a communication or network interface 518. The network interface 518 enables the computer 502 to communicate with remote devices. For example, the network interface 518 allows the computer 502 to communicate over communication networks or mediums 524B (representing a form of a computer useable or readable medium), such as LANs, WANs, the Internet, etc. The network interface 518 may interface with remote sites or networks via wired or wireless connections.

Control logic 528C may be transmitted to and from the computer 502 via the communication medium 524B. More particularly, the computer 502 may receive and transmit carrier waves (electromagnetic signals) modulated with control logic 530 via the communication medium 524B.

An article of manufacture comprising a computer useable or readable medium having control logic (software) stored therein is referred to herein as a computer program product or program storage device. This includes, but is not limited to, main memory 508, secondary storage devices 510, the removable storage unit 516 and the carrier waves modulated with control logic 530. Such computer program products, having control logic stored therein that, when executed by one or more data processing devices, cause such data processing devices to operate as described herein, represent embodiments of the invention. The term tangible computer program product is used to refer to any computer program product but not including a carrier wave or signal alone modulated with control logic.

Embodiments of the invention can work with software, hardware, and/or operating system implementations other than those described herein. Any software, hardware, and operating system implementations suitable for performing the functions described herein can be used. Embodiments of the invention are applicable to a client, a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method of 3D shape retrieval from a query 3D model, comprising:
   extracting, by one or more processing device, a plurality of features of the query 3D model;
   generating, by the one or more processing devices, a representation of the query 3D model;
   calculating, by the one or more processing devices, a first correlation by combining first coefficients associated with the representation of the query 3D model and second coefficients associated with representations of 3D models in the repository to obtain a first output and calculating an inverse rotational Fourier transform of the first output to obtain the first correlation, wherein a number of the first and second coefficients depends on a specified first bandwidth associated with the transform;
   calculating, by the one or more processing devices, a first similarity score based on the correlation;
   ranking, by the one or more processing devices, the 3D models based on the first similarity score;
   calculating, by the one or more processing devices, a second correlation by combining third coefficients associated with the representation of the query 3D model and fourth coefficients associated with representations of 3D models in the repository to obtain a second output and calculating an inverse rotational Fourier transform of the second output to obtain the second correlation, wherein a number of the third and fourth coefficients depends on a specified second bandwidth associated with the transform, the second bandwidth being higher than the first bandwidth;
   calculating, by the one or more processing devices, a second similarity score based on the second correlation;
   ranking, by the one or more processing devices, the 3D models used in the second correlation based on the second similarity score; and
   returning, by the one or more processing devices, one or more 3D models.

2. The computer implemented method of claim 1, further comprising:
   determining, by the one or more processing devices, a plurality of matching scores between the query 3D model and the 3D models in the repository for each rotational alignment of the query 3D model; and
   selecting, by the one or more processing devices, the highest score from the plurality of matching scores based on the determining step.

3. The computer implemented method of claim 1, wherein the combining step includes multiplication of the coefficients.

4. A computer based system for 3D shape matching and retrieval, comprising:
   one or more processors;
   a 3D model repository configured to store a plurality of 3D models;
   a model processing engine configured to generate representations of a query 3D model and 3D models in the 3D model repository; and
   a shape retrieval engine configured to retrieve the matching 3D models from the 3D model repository using at least the representation of the query 3D model and representations of the 3D models in the 3D model repository, the shape retrieval engine comprising:
      a comparator configured to:
         calculate a first correlation by combining first coefficients associated with the representation of the query 3D model and second coefficients associated with representations of 3D models in the repository to obtain a first output and calculating an inverse rotational Fourier transform of the first output to obtain the first correlation, wherein a number of the first and second coefficients depends on a specified first bandwidth associated with the transform;
         calculate a first similarity score based on the first correlation;
         rank one or more 3D models based on the first similarity score;
         calculating a second correlation by combining third coefficients associated with the representation of the query 3D model and fourth coefficients associated with representations of 3D models in the repository to obtain a second output and calculating an inverse rotational Fourier transform of the second output to obtain the second correlation, wherein a number of the third and fourth coefficients depends on a specified second bandwidth associated with the transform, the second bandwidth being higher than the first bandwidth;
         calculating, by the one or more processing devices, a second similarity score based on the second correlation;
         ranking, by the one or more processing devices, the 3D models used in the second correlation based on the second similarity score.

5. The system of claim 4, wherein the 3D model repository comprises a plurality of user generated models.

6. The system of claim 4, wherein the 3D model repository is a web-based repository.

7. The system of claim 4, wherein the model processing engine generates representations of the 3D models in the 3D model repository prior to receiving the query 3D model.

8. The system of claim 4, wherein the model processing engine comprises:
   an image generator, to extract a plurality of images from a 3D model;
   an image feature extractor, to extract a plurality of features from the images;
   a vector generator, to generate a feature vector from the features; and
   a transform calculator, to calculate at least a spherical Fourier transform using the features to generate a representation of the 3D model.

9. The system of claim 8, wherein the images are silhouette images obtained from a plurality of viewpoints surrounding the 3D model.

10. The system of claim 9, wherein the viewpoints are specified by a user.

11. The system of claim 9, wherein the viewpoints are selected by the model processing engine in a manner that captures a maximum amount of non-overlapping information with a given number of silhouette images.

12. The system of claim 4, wherein the model processing engine generates a plurality of silhouette descriptors.

13. The system of claim 12, wherein the silhouette descriptors are contour distance descriptors.

14. The system of claim 12, wherein the silhouette descriptors are Zernike descriptors.

15. The system of claim 8, wherein the image generator generates one hemisphere of silhouette images to reduce the number of images generated for a 3D model.

16. The system of claim 8, wherein the image generator generates a depth map, wherein each pixel in the depth map marks the distance from a 3D model to a silhouette plane.

17. The system of claim 8, wherein the image generator computes spherical Fourier coefficients for even degrees to reduce storage space of the representation of the 3D model.

18. The system of claim 8, wherein the transform calculator changes a number of spherical Fourier coefficients generated from the spherical Fourier transform.

19. The system of claim 4, wherein the comparator increases speed of a comparison by performing correlations at smaller resolutions.

20. The system of claim 4, wherein the comparator further computes a model matching score for each rotational alignment of the query 3D model.

21. A non-transitory, computer-readable storage medium having instructions stored thereon, execution of which by a processor cause the processor to perform operations, the operations comprising:

extracting a plurality of features of the query 3D model;

generating a representation of the query 3D model;

calculating a first correlation by combining first coefficients associated with the representation of the query 3D model and second coefficients associated with representations of 3D models in the repository to obtain a first output and calculating an inverse rotational Fourier transform of the first output to obtain the first correlation, wherein a number of the first and second coefficients depends on a specified first bandwidth associated with the transform;

calculating a first similarity score based on the correlation;

ranking the 3D models based on the first similarity score;

calculating a second correlation by combining third coefficients associated with the representation of the query 3D model and fourth coefficients associated with representations of 3D models in the repository to obtain a second output and calculating an inverse rotational Fourier transform the second output to obtain the second correlation, wherein a number of the third and fourth coefficients depends on a specified second bandwidth associated with the transform, the second bandwidth being higher than the first bandwidth;

calculating a second similarity score based on the second correlation;

ranking the 3D models used in the second correlation based on the second similarity score; and returning one or more 3D models.

\* \* \* \* \*